US005911915A

United States Patent [19]

Fonsny et al.

[11] Patent Number: 5,911,915

[45] Date of Patent: Jun. 15, 1999

[54] ANTIMICROBIAL MULTI PURPOSE MICROEMULSION

[75] Inventors: Pierre Fonsny, Fays, Belgium; Julie Burke, Somerset, N.J.; Didier Dormal, Grivegnee, Belgium

[73] Assignee: Colgate Palmolive Company, NY, N.Y.

[21] Appl. No.: 08/989,344

[22] Filed: Dec. 12, 1997

[51] Int. Cl.$^{6}$ .......................... A01N 25/02; B01J 13/00; C11D 1/835

[52] U.S. Cl. .......................... 252/312; 424/405; 510/365; 510/384; 510/417; 516/59; 516/62; 516/67; 516/69

[58] Field of Search .......................... 252/312; 510/365, 510/384, 417; 516/59, 62, 67, 69; 424/405

[56] References Cited

U.S. PATENT DOCUMENTS

| | | | |
|---|---|---|---|
| 4,272,395 | 6/1981 | Wright | 510/384 |
| 5,008,030 | 4/1991 | Cook et al. | 510/384 |
| 5,454,984 | 10/1995 | Graubart et al. | 510/384 |
| 5,486,307 | 1/1996 | Misselyn et al. | 510/365 |
| 5,523,013 | 6/1996 | Durbut et al. | 510/365 X |
| 5,549,840 | 8/1996 | Mondin et al. | 252/312 X |
| 5,591,708 | 1/1997 | Richter | 510/384 X |
| 5,656,585 | 8/1997 | Grandmaire et al. | 252/312 X |
| 5,691,289 | 11/1997 | Purcell et al. | 510/417 X |

*Primary Examiner*—Richard D. Lovering
*Attorney, Agent, or Firm*—Richard E. Nanfelat; James M. Serafino

[57] ABSTRACT

An improvement is described in microemulsion compositions which are especially effective in disinfecting the surface being cleaned and in the removal of oily and greasy soil without leaving streaks which contains a mixture of a nonionic surfactant, a cationic surfactant and an amphoteric surfactant, a hydrocarbon ingredient, natural disinfectant ingredients, a water soluble solvent, and water.

4 Claims, No Drawings

ANTIMICROBIAL MULTI PURPOSE MICROEMULSION

FIELD OF THE INVENTION

This invention relates to an improved multi purpose liquid cleaner in a microemulsion form, to be used neat, in particular for cleaning and disinfecting hard surfaces and which is effective in sanitizing surfaces, in removing grease soil and also dries fast leaving the surfaces streak free.

BACKGROUND OF THE INVENTION

Disinfectant composition based on cationic and nonionic are well known. However, these compositions while very efficient in disinfecting surfaces, generally do not remove grease and oil as desired; hence, leaving residues and streaks on surfaces. Addition of an efficient anionic surfactant cleaner, to the cationic surfactant, either creates instability problems or deactivates the disinfectant behavior of the cationic. Anionic and nonionic mixtures have a good grease removal properties, but do not perform at all to sanitize the surface being cleaned.

SUMMARY OF THE INVENTION

The instant compositions exhibit good grease removal properties combined with excellent disinfecting properties and the compositions do not leave streak or residue on the surface being cleaned.

The described compositions are to be used mainly neat in a spray form. The compositions contain a lower level of surfactant than current all purpose cleaning compositions and have a richer level of solvent than surfactant. In order to have a product which leaves the surfaces shiny after cleaning, the instant compositions are builder free.

The instant compositions teach that combination of amine oxide nonionic surfactant, fatty alcohol nonionic surfactant and cationic surfactant have better grease removal properties while maintaining the disinfecting efficacy. This improvement is linked to the fact that the instant compositions are microemulsion.

One particular grade of amine oxide (Tomah's AO14-2) has been found to reduce streaks induced by nonionic surfactant. Amine oxide nonionic surfactants are however expensive and have to be free of nitrosamine to allow their usage.

A more cost effective way than using amine oxide surfactant has been to use an amphoteric surfactant in combination with a fatty alcohol nonionic surfactant and with a cationic. Alkylaminocarboxylate surfactant at pH 7 to 10 will exhibit a behavior similar to a composition of anionic surfactant, in combination with nonionic surfactant which have an excellent grease removal efficacy. The amphoteric surfactant will not react with the cationic surfactant and some amphoteric surfactants have even demonstrated a disinfecting action which becomes cumulative with the cationic bactericidal effect. Some amphoteric are known to alter the bacteria cell membrane and allow a better efficacy of the bactericide.

Cationic surfactants have demonstrated different grease removal efficacy depending on their structure. Alkyl dimethyl benzyl quaternary ammonium exhibits good grease and fat removal but will leave residue on surfaces. Di-alkyl dimethyl quaternary ammonium, while still having good grease removal efficiency, have been found to significantly reduce the residues and streaks when used in combination with a fatty alcohol nonionic and an amphoteric surfactant.

A safe solvent system used in the instant compositions which has been found effective are glycol ethers such as propylene glycol butyl ether (PNB) alone or in combination with ethanol. PNB brings a significant benefit in degreasing performance and also promotes a fast drying out of the surface which has been cleaned. Oily material such as essential oil or perfume, when added to a composition, usually increase the streaks on surfaces.

The combination of a glycol ether with the surfactant system of the present invention allows a faster water film dry out time than obtained with current commercial spray formulations. It is important to select the perfume such as an essential oil not only to satisfy the cosmetic and the marketing needs, but also to have a minimum of residue left on the surface being cleaned. The selection of essential oils is also important because not only they will communicate the efficacy of the product to the consumer but also because they are effective bactericide.

In one aspect, the invention generally provides a stable, clear multi purpose, hard surface cleaning composition especially effective in disinfecting the surface being cleaned and in the removal of oily and greasy oil while a fast dry out time and without leaving streaks on the surface being cleaned. The compositions include approximately, on a weight basis:

from 0.1% to 20% of at least nonionic surfactant and/or a mixture of a partially esterified ethoxylated polyhydric alcohol, a fully esterified ethoxylated polyhydric alcohol, and a nonesterified polyhydric alcohol (said mixture being herein after referred to as an ethoxylated glycerol type compound);

from 0.1 to 20% of at least one disinfecting agent such as cationic surfactant such as dimethyl dialkyl ammonium chloride such as the Bardac 2170 or 2180 and/or a mixture of dialkyl dimethyl ammonium chloride and an alkyl benzyl ammonium chloride such as Bardac 22;

from 0.1 to 20% of at least amphoteric surfactant;

0 to 15% of at least a water soluble solvent;

0.4% to 3.0% of a perfume, water insoluble organic compound or essential oil; and the balance being water.

DETAILED DESCRIPTION OF THE INVENTION

The present invention relates to a stable hard surface cleaning composition approximately by weight:

0.1% to 20% of a nonionic surfactant and/or an ethoxylated glycerol type compound;

0.1% to 20% of at least one disinfecting agent such as a cationic surfactant, 0. 1 % to 20% of an amphoteric surfactant, 0 to 15% of at least one water soluble solvent;

0.1% to 3.0% of a water insoluble organic compound, essential oil, or a perfume, and the balance being water.

As used herein and in the appended claims the term "perfume" is used in its ordinary sense to refer to and include any non-water soluble fragrant substance or mixture of substances including natural (i.e., obtained by extraction of flower, herb, blossom or plant), artificial (i.e., mixture of natural oils or oil constituents) and synthetically produced substance) odoriferous substances. Typically, perfumes are complex mixtures of blends of various organic compounds such as alcohols, aldehydes, ethers, aromatic compounds and varying amounts of essential oils (e.g., terpenes) such as from 0% to 80%, usually from 10% to 70% by weight, the essential oils themselves being volatile odoriferous compounds and also serving to dissolve the other components of the perfume.

In the present invention the precise composition of the perfume is of no particular consequence to cleaning performance so long as it meets the criteria of water immiscibility and having a pleasing odor. Naturally, of course, especially for cleaning compositions intended for use in the home, the perfume, as well as all other ingredients, should be cosmetically acceptable, i.e., non-toxic, hypoallergenic, etc.

The water insoluble organic compound, essential oil or perfume is present in the composition in an amount of from 0.1% to 1.0% by weight, preferably from 0.4% to 8% by weight, especially preferably from 0.5% to 6% by weight.

Furthermore, although superior grease removal performance will be achieved for perfume compositions not containing any terpene solvents, it is apparently difficult for perfumers to formulate sufficiently inexpensive perfume compositions for products of this type (i.e., very cost sensitive consumer-type products) which includes less than 20%, usually less than 30%, of such terpene solvents.

The water insoluble saturated or unsaturated organic compound is selected from the group consisting of water insoluble hydrocarbons containing a cycloalkyl group having 5 to 10 carbon atoms, wherein the alkyl or cycloalkyl group can be saturated or unsaturated and the cycloalkyl group can have one or more saturated or unsaturated alkyl groups having 1 to 20 carbon atoms affixed to the alkyl or cycloalkyl group and one or more halogens, alcohols, nitro or ester group substituted on the cycloalkyl group or alkyl group; aromatic hydrocarbons; water insoluble ethers; water insoluble carboxylic acids, water insoluble alcohols, water insoluble amines, water insoluble esters, nitropropane, 2,5dimethylhydrofuran, 2-ethyl2-methyl 1,3dioxolane, 3-ethyl 4-propyl tetrahydropyran, N-isopropyl morpholine, alpha-methyl benzyldimethylamine, methyl chloroform and methyl perchlorapropane, and mixtures thereof. Typical hydrocarbons are cyclohexyl-1 decane, methyl-3 cyclohexyl-9 nonane, methyl-3 cyclohexyl-6 nononane, dimethyl cycloheplane, trimethyl cyclopentane, ethyl-2 isopropyl-4 cyclohexane. Typical aromatic hydrocarbons are bromotoluene, diethyl benzene, cyclohexyl bromoxylene, ethyl-3 pentyl-4 toluene, tetrahydronaphthalene, nitrobenzene, and methyl naphthalene. Typical water insoluble esters are benzyl acetate, dicyclopentadienylacetate, isononyl acetate, isobornyl acetate and isobutyl isobutyrate. Typical water insoluble ethers are di(alphamethyl benzyl) ether, and diphenyl ether. A typical alcohol is phenoxyethanol. A typical water insoluble nitro derivative is nitro propane.

Suitable essential oils are selected from the group consisting of: Anethole 20/21 natural, Aniseed oil china star, Aniseed oil globe brand, Balsam (Peru), Basil oil (India), Black pepper oil, Black pepper oleoresin 40/20, Bois de Rose (Brazil) FOB, Borneol Flakes (China), Camphor oil, White, Camphor powder synthetic technical, Cananga oil (Java), Cardamom oil, Cassia oil (China), Cedarwood oil (China) BP, Cinnamon bark oil, Cinnamon leaf oil, Citronella oil, Clove bud oil, Clove leaf, Coriander (Russia), Coumarin 69° C. (China), Cyclamen Aldehyde, Diphenyl oxide, Ethyl vanilin, Eucalyptol, Eucalyptus oil, Eucalyptus citriodora, Fennel oil, Geranium oil, Ginger oil, Ginger oleoresin (India), White grapefruit oil, Guaiacwood oil, Gurjun balsam, Heliotropin, Isobornyl acetate, Isolongifolene, Juniper berry oil, L-methyl acetate, Lavender oil, Lemon oil, Lemongrass oil, Lime oil distilled, Litsea Cubeba oil, Longifolene, Menthol crystals, Methyl cedryl ketone, Methyl chavicol, Methyl salicylate, Musk ambrette, Musk ketone, Musk xylol, Nutmeg oil, Orange oil, Patchouli oil, Peppermint oil, Phenyl ethyl alcohol, Pimento berry oil, Pimento leaf oil, Rosalin, Sandalwood oil, Sandenol, Sage oil, Clary sage, Sassafras oil, Spearmint oil, Spike lavender, Tagetes, Tea tree oil, Vanilin, Vetyver oil (Java), Wintergreen, Allocimene, Arbanex™, Arbanol®, Bergamot oils, Camphene, Alpha-Campholenic aldehyde, I-Carvone, Cineoles, Citral, Citronellol Terpenes, Alpha-Citronellol, Citronellyl Acetate, Citronellyl Nitrile, Para-Cymene, Dihydroanethole, Dihydrocarveol, d-Dihydrocarvone, Dihydrolinalool, Dihydromyrcene, Dihydromyrcenol, Dihydromyrcenyl Acetate, Dihydroterpineol, Dimethyloctanal, Dimethyloctanol, Dimethyloctanyl Acetate, Estragole, Ethyl-2 Methylbutyrate, Fenchol, Fernlol™, Florilys™, Geraniol, Geranyl Acetate, Geranyl Nitrile, Glidmint™ Mint oils, Glidox™, Grapefruit oils, trans-2-Hexenal, trans-2-Hexenol, cis-3-Hexenyl Isovalerate, cis-3-Hexanyl-2-methylbutyrate, Hexyl Isovalerate, Hexyl-2-methylbutyrate, Hydroxycitronellal, lonone, Isobornyl Methylether, Linalool, Linalool Oxide, Linalyl Acetate, Menthane Hydroperoxide, I-Methyl Acetate, Methyl Hexyl Ether, Methyl-2-methylbutyrate, 2-Methylbutyl Isovalerate, Myrcene, Nerol, Neryl Acetate, 3-Octanol, 3-Octyl Acetate, Phenyl Ethyl-2-methylbutyrate, Petitgrain oil, cis-Pinane, Pinane Hydroperoxide, Pinanol, Pine Ester, Pine Needle oils, Pine oil, alpha-Pinene, beta-Pinene, alpha-Pinene Oxide, Plinol, Plinyl Acetate, Pseudo lonone, Rhodinol, Rhodinyl Acetate, Spice oils, alpha-Terpinene, gamma-Terpinene, Terpinene-4-OL, Terpineol, Terpinolene, Terpinyl Acetate, Tetrahydrolinalool, Tetrahydrolinalyl Acetate, Tetrahydromyrcenol, Tetralol®, Tomato oils, Vitalizair, Zestoral™, HINOKITIOL™ and THUJOPSIS DOLABRATA™.

The water soluble nonionic surfactants utilized in this invention are commercially well known and include the primary aliphatic alcohol ethoxylates, secondary aliphatic alcohol ethoxylates, alkylphenol ethoxylates and ethylene-oxide-propylene oxide condensates on primary alkanols, such a Plurafacs (BASF) and condensates of ethylene oxide with sorbitan fatty acid esters such as the Tweens (ICI). The nonionic synthetic organic detergents generally are the condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a water-soluble nonionic detergent. Further, the length of the polyethenoxy chain can be adjusted to achieve the desired balance between the hydrophobic and hydrophilic elements.

The nonionic detergent class includes the condensation products of a higher alcohol (e.g., an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

A preferred group of the foregoing nonionic surfactants are the Neodol ethoxylates (Shell Co.), which are higher aliphatic, primary alcohol containing about 9–15carbon atoms, such as $C_9$–$C_{11}$ alkanol condensed with 2.5 TO 10 moles of ethylene oxide (NEODOL 91-2.5 OR -5 OR -6 OR -8), $C_{12}$–$C_{13}$ alkanol condensed with 6.5 moles ethylene oxide (Neodol 23-6.5), $C_{12}$–$C_{15}$ alkanol condensed with 12 moles ethylene oxide (Neodol 25-12), $C_{14}$–$C_{15}$ alkanol condensed with 13 moles ethylene oxide (Neodol 45-13), and the like.

Additional satisfactory water soluble alcohol ethylene oxide condensates are the condensation products of a secondary aliphatic alcohol containing 8 to 18 carbon atoms in a straight or branched chain configuration condensed with 5 to 30 moles of ethylene oxide. Examples of commercially available nonionic detergents of the foregoing type are $C_{11}$–$C_{15}$ secondary alkanol condensed with either 9 EO (Tergitol 15-S-9) or 12 EO (Tergitol 15-S-12) marketed by Union Carbide.

Other suitable nonionic detergents include the polyethylene oxide condensates of one mole of alkyl phenol containing from about 8 to 18 carbon atoms in a straight- or branched chain alkyl group with about 5 to 30 moles of ethylene oxide. Specific examples of alkyl phenol ethoxylates include nonyl phenol condensed with about 9.5 moles of EO per mole of nonyl phenol, dinonyl phenol condensed with about 12 moles of EO per mole of phenol, dinonyl phenol condensed with about 15 moles of EO per mole of phenol and di-isoctylphenol condensed with about 15 moles of EO per mole of phenol. Commercially available nonionic surfactants of this type include Igepal CO-630 (nonyl phenol ethoxylate) marketed by GAF Corporation.

Also among the satisfactory nonionic detergents are the water-soluble condensation products of a $C_8$–$C_{20}$ alkanol with a heteric mixture of ethylene oxide and propylene oxide wherein the weight ratio of ethylene oxide to propylene oxide is from 2.5:1 to 4:1, preferably 2.8:1 to 3.3:1, with the total of the ethylene oxide and propylene oxide (including the terminal ethanol or propanol group) being from 60–85%, preferably 70–80%, by weight. Such detergents are commercially available from BASF-Wyandotte and a particularly preferred detergent is a $C_{10}$–$C_{16}$ alkanol condensate with ethylene oxide and propylene oxide, the weight ratio of ethylene oxide to propylene oxide being 3:1 and the total alkoxy content being about 75% by weight.

Condensates of 2 to 30 moles of ethylene oxide with sorbitan mono- and tri-$C_{10}$–$C_{20}$ alkanoic acid esters having a HLB of 8 to 15 also may be employed as the nonionic detergent ingredient in the described composition. These surfactants are well known and are available from Imperial Chemical Industries under the Tween trade name. Suitable surfactants include polyoxyethylene (4) sorbitan monolaurate, polyoxyethylene (4) sorbitan monostearate, polyoxyethylene (20) sorbitan trioleate and polyoxyethylene (20) sorbitan tristearate.

Other suitable water-soluble nonionic detergents are marketed under the trade name “Pluronics”. The compounds are formed by condensing ethylene oxide with a hydrophobic base formed by the condensation of propylene oxide with propylene glycol. The molecular weight of the hydrophobic portion of the molecule is of the order of 950 to 4000 and preferably 200 to 2,500. The addition of polyoxyethylene radicals to the hydrophobic portion tends to increase the solubility of the molecule as a whole so as to make the surfactant water-soluble. The molecular weight of the block polymers varies from 1,000 to 15,000 and the polyethylene oxide content may comprise 20% to 80% by weight. Preferably, these surfactants will be in liquid form and satisfactory surfactants are available as grades L 62 and L 64.

The instant composition can contain alone or in combination with the at least one nonionic surfactant a composition (herein after referred to as ethoxylated glycerol type compound) which is a mixture of a fully esterified ethoxylated polyhydric alcohol, a partially esterified ethoxylated polyhydric alcohol and a nonesterified ethoxylated polyhydric alcohol, wherein the preferred polyhydric alcohol is glycerol, and the compound is Formula (I)

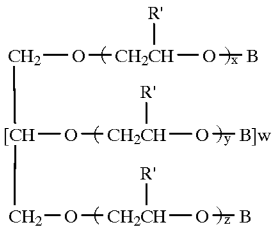

and

Formula (II)

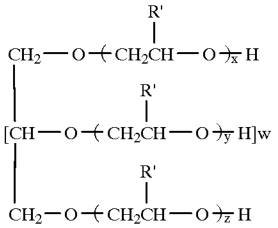

wherein w equals one to four, most preferably one. B is selected from the group consisting of hydrogen or a group represented by:

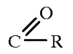

wherein R is selected from the group consisting of alkyl group having 6 to 22 carbon atoms, more preferably 11 to 15 carbon atoms and alkenyl groups having 6 to 22 carbon atoms, more preferably 11 to 15 carbon atoms, wherein a hydrogenated tallow alkyl chain or a coco alkyl chain is most preferred, wherein at least one of the B groups is represented by said

and R' is selected from the group consisting of hydrogen and methyl groups; x, y and z have a value between 0 and 60, more preferably 0 to 40, provided that (x+y+z) equals 2 to 100, preferably 4 to 24 and most preferably 4 to 19, wherein in Formula (I) the ratio of monoester/diester/triester is 45 to 90/5 to 40/1 to 20, more preferably 50 to 90/9 to 32/1 to 12, wherein the ratio of Formula (I) to Formula (II) is a value between 3 to 0.02, preferably 3 to 0.1, most preferably 1.5 to 0.2, wherein it is most preferred that there is more of Formula (II) than Formula (I) in the mixture that forms the compound.

The ethoxylated glycerol type compound used in the instant composition is manufactured by the Kao Corporation and sold under the trade name Levenol such as Levenol F-200 which has an average EO of 6 and a molar ratio of coco fatty acid to glycerol of 0.55 or Levenol V501/2 which has an average EO of 17 and a molar ratio of tallow fatty acid to glycerol of 1.0. It is preferred that the molar ratio of the fatty acid to glycerol is less than 1.7, more preferably less than 1.5 and most preferably less than 1.0. The ethoxylated glycerol type compound has a molecular weight of 400 to 1600, and a pH (50 grams/liter of water) of 5–7. The Levenol compounds are substantially non irritant to human skin and have a primary biodegradabillity higher than 90% as measured by the Wickbold method Bias-7d.

Two examples of the Levenol compounds are Levenol V-501/2 which has 17 ethoxylated groups and is derived from tallow fatty acid with a fatty acid to glycerol ratio of 1.0 and a molecular weight of 1465 and Levenol F-200 has 6 ethoxylated groups and is derived from coco fatty acid with a fatty acid to glycerol ratio of 0.55. Both Levenol F-200 and Levenol V-501/2 are composed of a mixture of Formula (I) and Formula (II). The Levenol compounds has ecoxicity values of algae growth inhibition >100 mg/liter; acute toxicity for Daphniae>100 mg/liter and acute fish toxicity>100 mg/liter. The Levenol compounds have a ready biodegradability higher than 60% which is the minimum required value according to OECD 301 B measurement to be acceptably biodegradable.

Polyesterified nonionic compounds also useful in the instant compositions are Crovol PK-40 and Crovol PK-70 manufactured by Croda GMBH of the Netherlands. Crovol PK-40 is a polyoxyethylene (12) Palm Kernel Glyceride which has 12 EO groups. Crovol PK-70 which is prefered is a polyoxyethylene (45) Palm Kernel Glyceride have 45 EO groups.

Although all the above nonionic compounds are highly suitable, some of them do not deliver the right foam control and/or low enough ecotoxicity value. This is the reason why the present compositions can incorporate new nonionic type of surfactant which deliver outstanding foam control and very good ecotoxicity value. Both Ni's are produced by DOW chemical which chemical structure is shown below. Their development name are Polyglycol EB95-0779 and EB-0843/1.

The major class of compounds found to provide highly suitable water soluble solvent for the composition are water-soluble polyethylene glycols having a molecular weight of 150 to 1000, polypropylene glycol of the formula $HO(CH_3CHCH_2O)_NH$ wherein n is a number from 2 to 18, mixtures of polyethylene glycol and polypropyl glycol (Synalox) and mono and di $C_1$–$C_6$ alkyl ethers and esters of ethylene glycol and propylene glycol having the structural formulas $R(X)_nOH$ $R_1(X)_nOH$ $R(X)_nOR$ and $R_1(X)_nOR_1$ wherein R is $C_1$–$C_6$ alkyl group, $R_1$ is $C_2$–$C_4$ acyl group, X is $(OCH_2CH_2)$ or $(OCH_2(CH_3)CH)$ and n is a number from 1 to 4, diethylene glycol, triethylene glycol, an alkyl lactate, wherein the alkyl group has 1 to 6 carbon atoms, 1 methoxy-2-propanol, 1 methoxy-3-propanol, and 1 methoxy 2-, 3- or 4-butanol.

Representative members of the polypropylene glycol include dipropylene glycol and polypropylene glycol having a molecular weight of 150 to 1000, e.g., polypropylene glycol 400. Other satisfactory glycol ethers are ethylene glycol monobutyl ether (butyl cellosolve), diethylene glycol monobutyl ether (butyl carbitol), triethylene glycol monobutyl ether, mono, di, tri propylene glycol monobutyl ether, tetraethylene glycol monobutyl ether, mono, di, tripropylene glycol monomethyl ether, propylene glycol monomethyl ether, ethylene glycol monohexyl ether, diethylene glycol monohexyl ether, propylene glycol tertiary butyl ether, ethylene glycol monoethyl ether, ethylene glycol monomethyl ether, ethylene glycol monopropyl ether, ethylene glycol monopentyl ether, diethylene glycol monomethyl ether, diethylene glycol monoethyl ether, diethylene glycol monopropyl ether, diethylene glycol monopentyl ether, triethylene glycol monomethyl ether, triethylene glycol monoethyl ether, triethylene glycol monopropyl ether, triethylene glycol monopentyl ether, triethylene glycol monohexyl ether, mono, di, tripropylene glycol monoethyl ether, mono, di tripropylene glycol monopropyl ether, mono, di, tripropylene glycol monopentyl ether, mono, di, tripropylene glycol monohexyl ether, mono, di, tributylene glycol mono methyl ether, mono, di, tributylene glycol monoethyl ether, mono, di, tributylene glycol monopropyl ether, mono, di, tributylene glycol monobutyl ether, mono, di, tributylene glycol monopentyl ether and mono, di, tributylene glycol monohexyl ether, ethylene glycol monoacetate and dipropylene glycol propionate. These glycol type water soluble solvents are at a concentration of about 0 to about 15 weight %, more preferably about 1 weight % to about 12%.

While all of the aforementioned glycol ether compounds provide the described stability, the most preferred cosurfactant compounds of each type, on the basis of performance and cosmetic appearance (particularly odor), is propylene glycol monobutyl ether.

Additional water soluble solvent useful in the instant compositions are $C_1$–$C_3$ alcohols such as methanol, ethanol and isopropanol which can be used in blend with above mentioned glycol ethers blends weight ratios of glycol ethers and alcohol are 1:5 to 5:1, more preferably 1:1.

Generally, amounts of water soluble solvents in the range of from 0 to 15%, preferably from about 1 wt. % to 12 wt. % provide stable compositions for the above-described levels of primary surfactants and water insoluble hydrocarbon, perfume or essential and any other additional ingredients as described below.

The instant compositions contain about 0.1 to about 2.0 wt. %, more preferably 0.25 to 8 wt. % of a disinfectant agent selected from the group consisting of $C_8$–$C_{16}$ alkyl amines, $C_8$–$C_{16}$ alkyl benzyl dimethyl ammonium chlorides, $C_8$–$C_{16}$ dialkyl dimethyl ammonium chlories, $C_8$–$C_{16}$ alkyl, $C_8$–$C_{14}$ alkyl dimethyl ammonium chloride and chlorhexidine and mixtures thereof.

Some typical disinfectant agent useful in the instant compositions are manufactured by Lonza, S.A. They are: Bardac 2180 (or 2170) which is N-decyl-N-isonoxyl-N, N-dimethyl ammonium chloride; Bardac 22 which is didecyl dimethyl ammonium chloride; Bardac LF which is N,Ndioctyl-N, N-dimethyl ammonium chloride; Bardac 114 which is a mixture in a ratio of 1:1:1 of N-alkyl-N, N-didecyl-N, N-dimethyl ammonium chloride/N-alkyl-N, N-dimethyl-N-ethyl ammonium chloride; and Barquat MB-50 which is N-alkyl-N, N-dimethyl-N-benzyl ammonium chloride.

The amine oxides which can be optionally used at a concentration of 0 to 10 wt. %, more preferably 0.1 wt. % to 8 wt. % in the instant formula are depicted by the formula:

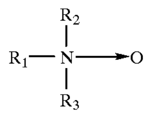

wherein $R_1$ IS A $C_{10}$–$C_{18}$ linear or branched chain alkyl group, $R_2$ is a $C_1$–$C_{16}$ linear alkyl group and $R_3$ is a $C_1$–$C_{16}$ linear alkyl group. amine oxides can significantly decrease the residues left on surfaces. A preferred amine oxide, in addition to decyl-lauryl di-methyl amine oxide (Barlox 12i & 10s ex lonza) is a C10 alkyl di-ethyl amine oxide (AO-14-2) from TOMAH.

The instant composition can also optionally contain 0 to 10%, more preferably 0.1 to 8%, by weight of an amphoteric surfactant. They can be a water-soluble betaine having the general formula:

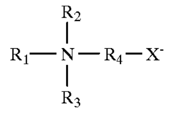

wherein $x^-$ is selected from the group consisting of $CO_2$- and $SO_3$- and $R_1$ is an alkyl group having 10 to about 20 carbon atoms, preferably 12 to 16 carbon atoms, or an amido radical:

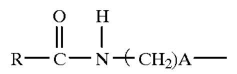

wherein R is an alkyl group having about 9 to 19 carbon atoms and a is the integer 1 to 4; $R_2$ and $R_3$ are each alkyl groups having 1 to 3 carbon atoms and preferably 1 carbon; $R_4$ is an alkylene or hydroxyalkylene group having from 1 to 4 carbon atoms and, optionally, one hydroxyl group. Typical alkyldimethyl betaines include decyl dimethyl betaine or 2-(N-decyl-N, N-dimethyl-ammonia) acetate, coco dimethyl betaine or 2-(N-coco N, N-dimethylammonia) acetate, myristyl dimethyl betaine, plamityl dimethyl betaine, lauryl dimethyl betaine, cetyl dimethyl betaine, stearyl dimethyl betaine, etc. The amido betaines similarly include cocoamidoethylbetaine, cocoamidopropyl betaine and the like. A preferred betaine is coco ($C_8$–$C_8$) amidopropyl dimethyl betaine. Two preferred betaine surfactants are Rewoteric AMB 13 and GOLMSCHMIDT betaine L7.

Another more preferred amphoteric material is an alkylaminocarboxylate group such as the glycine,N-(3 amino propyl)-C10–16 alkyl derivatives from Rhone Poulenc (their amphionic SFB). The amphoteric surfactants used at levels from 1 wt. % to 20 wt. % preferably at 1 wt. % to 10 wt. %, at pH of 7 to 10, preferably at a pH of 8 to 9 combines excellent degreasing efficacy, in combination with nonionic and in presence of cationic, and also bring additional biocide activity to the composition.

The pH of the composition will be adjusted to pH 7 to 10 with NAOH, KOH, . . . but preferable with an organic alkalinity donor which will not leave streaks such as diethanolamine or triethanolamine.

The final essential ingredient in the inventive compositions having improved interfacial tension properties is water. The proportion of water in the compositions generally is in the range of 20% to 97%, preferably 70% to 97% by weight.

In addition to the above-described essential ingredients, the compositions of this invention may often and preferably do contain one or more additional ingredients which serve to improve overall product performance.

The multi purpose liquid cleaning composition of this invention may, if desired, also contain other components either to provide additional effect or to make the product more attractive to the consumer. The following are mentioned by way of example: Colors or dyes in amounts up to 0.5% by weight, 2,6-di-tert.butyl-p-cresol, etc., in amounts up to 2% by weight; and pH adjusting agents, such as sulfuric acid or sodium hydroxide, as needed. Furthermore, if opaque compositions are desired, up to 4% by weight of an opacifier may be added.

In their final form, the multi purpose liquids are clear compositions and exhibit stability at reduced and increased temperatures. More specifically, such compositions remain clear and stable in the range of 5° C. to 50° C., especially 10° C. to 43° C. and the compositions exhibit a pH in the neutral to the alkaline range.

The compositions are directly ready for use as desired and only minimal rinsing is required and substantially no residue or streaks are left behind. Furthermore, because the compositions are free of detergent builders such as alkali metal polyphosphates they are environmentally acceptable and provide a better "shine" on cleaned hard surfaces.

When intended for use in the neat form, the liquid compositions can be packaged under pressure in an aerosol container or in a pump-type sprayer for the so-called spray-and-wipe type of application. The composition can also be dispensed from a non woven or fabric towel which can be used once and discarded or reused several times with adequate rinsing between usage.

Because the compositions as prepared are aqueous liquid formulations, the compositions are easily prepared simply by combining all the ingredients in a suitable vessel or container. The order of mixing the ingredients is not particularly important and generally the various ingredients can be added sequentially or all at once or in the form of aqueous solutions of each or all of the primary detergents and cosurfactants can be separately prepared and combined with each other and with the perfume. It is not necessary to use elevated temperatures in the formation step and room temperature is sufficient.

The instant formulas explicitly exclude alkali metal silicates and alkali metal builders such as alkali metal polyphosphates, alkali metal carbonates, alkali metal phosphonates and alkali metal citrates because these materials, if used in the instant composition, would cause the composition to have a high pH as well as leaving residue on the surface being cleaned.

The following examples illustrate liquid cleaning compositions of the described invention. Unless otherwise specified, all percentages are by weight. The exemplified compositions are illustrative only and do not limit the scope of the invention. Unless otherwise specified, the proportions in the examples and elsewhere in the specification are by weight.

| | 1 | 2 | 3 | 4 | 5 | 6 | 7 | 8 |
|---|---|---|---|---|---|---|---|---|
| Neodol 91-5 | 1.55 | 1.55 | 1.55 | 2 | 1.55 | 1.55 | | |
| Neodol 91-6 | | | | | | | 1.55 | 1.55 |
| Bardac 2170 | | 0.5 | | | 1.4 | | | 0.5 |
| Bardac 22 | | | | | | 0.5 | 0.5 | |
| Amphionic SFB | 0.9 | 0.9 | 1.4 | 0.9 | | 0.9 | 0.9 | 0.9 |
| Propylene glycol n-butyl ether | 4 | 4 | 4 | 4 | 4 | 3 | 4 | 4 |
| Water | Bal. | Bal. | Bal. | Bal. | Bal. | Bal. | Bal. | Bal. |
| pH | 8.9 | 8.5 | 8.5 | 8.5 | 8.5 | 8.5 | 8.5 | 8.5 |
| Disinfecting results neat | | | | | | | | |
| EN1040 | >5log | >5log | — | — | — | — | — | — |
| EN 1276 | — | — | | | | | | |
| AFNOR 72190 | — | — | | | | | | |
| % degreasing test neat vs reference[1] | 71 | 91 | 95 | 82 | 65.3 | 83 | 87.5 | 86.9 |
| Residue vs reference[2] | 49 | 69 | 51 | 60 | 88 | 56 | 50 | 80 |
| oil uptake oil level/surfactant level | 0.5 | 1.46 | — | — | — | — | — | — |

| | 9 | 10 | 11 | 12 | 13 | 14 | 15 | 16 | 17 |
|---|---|---|---|---|---|---|---|---|---|
| Neodol 91-5 | 1.55 | 1.55 | | | 1.55 | 1.55 | 1.55 | 1.55 | 1.55 |
| Bardac 2170 | 0.25 | 0.5 | 0.5 | 0.5 | 0.5 | 0.5 | 0.5 | 0.5 | 0.5 |
| Bardac 22 | 0.25 | | | | | | | | |
| Bast Plurafac | | | 1.4 | 1.5 | | | | | |
| Ao 14-2 | | | 0.85 | | | | | | |
| Barlox 12i | | | | 0.84 | | | | | |
| Amphionic SFB | 0.9 | 0.9 | | | | | | 0.225 | |
| Cocoamido propyl betaine | | | | | 0.9 | | 0.9 | 0.675 | 0.9 |
| Lauryl alkyl dimethyl betaine | | | | | | 0.9 | | | |
| Propylene glycol n-butyl ether | 4 | 2 | 2 | 2 | 4 | 4 | 4 | 4 | 4 |
| Ethanol | | | | | | | | | 1 |
| Triethanol amine | | | | | | | 0.13 | | 0.13 |
| Water | Bal. | Bal. | Bal. | Bal. | Bal. | Bal. | Bal. | Bal. | Bal. |
| Ph | 8.5 | 8.5 | 8.5 | 8.5 | 5.5 | 5.3 | 8.5 | 7.2 | 7.2 |
| Disinfecting results neat | | | | | | | | | |
| EN1040 | — | — | — | — | >5log | — | >5log | >5log | |
| EN 1276 | | | | | — | | TBD | — | |
| AFNOR 72190 | | | | | — | | TBD | — | |
| % degreasing test neat vs reference | 80.8 | 62 | 58 | 53.6 | 82 | 85 | 95 | 90 | |
| Residue vs reference | 76 | 70 | 62 | *55 | 59 | — | 91 | 72 | |
| oil uptake oil level/surfactant level | — | — | — | — | 2.31 | — | 2.78 | 2.59 | |

[1]The higher the value, the best the result (a value of 100 meaning excellent grease removal versus anionic/nonionic based spray reference).
[2]The higher the value, the best the result (a value of 100 meaning no residue versus a window cleaner spray reference).

The test protocol used to assess disinfection is the well known French AFNOR Norm 72-151 which uses four different strains of bacteria, a short contact time and calls for a bacteria count reduction of 5 log.

In summary, the described invention broadly relates to an improved microemulsion composition containing a cationic surfactant, a nonionic surfactant and an amphoteric surfactant, a water soluble solvent, a hydrocarbon ingredient and water.

What is claimed:

1. A microemulsion composition consisting essentially of approximately by weight:

(a) 0.1% to 20% of at least one disinfecting agent which is selected from the group consisting of a $C_8$–$C_{16}$ alkyl amine, a $C_8$–$C_{16}$ dialkyl dimethyl ammonium chloride, $C_8$–$C_{16}$ alkyl benzyl dimethyl ammonium chlorides, chlorohexidine and mixtures thereof;

(b) 0.1 wt. % to 20 wt. % of at least one surfactant selected from the group consisting of an ethoxylated nonionic surfactant and a compound which is a mixture of:

(I)

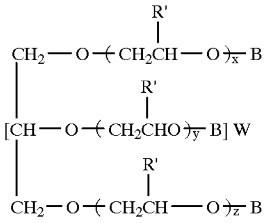

and (II)

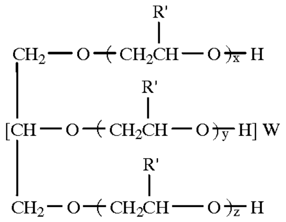

wherein w equals one to four, B is selected from the group consisting of hydrogen and a group represented by:

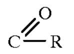

wherein R is selected from the group consisting of alkyl group having 6 to 22 carbon atoms, and alkenyl groups having 6 to 22 carbon atoms, wherein at least one of the B groups is represented by said

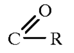

R' is selected from the group consisting of hydrogen and methyl groups; X, Y and Z have a value between 0 and 60, provided that (X+Y+Z) equals 2 to 100, wherein in formula (I) the ratio of monoester/diester/triester is 40 to 90/5 to 35/1 to 20, wherein the ratio of formula (I) to formula (II) is a value between 3 to 0.02;

(c) 0.1% to 20% of an amphoteric surfactant selected from the group consisting of having the general formula:

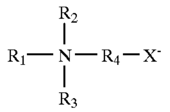

wherein $X^{31}$ is selected from the group consisting of $CO_2$— and $SO_3$— and $R_1$ is an alkyl group having 10 to about 20 carbon atoms, or an amido radical:

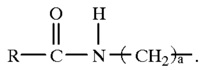

wherein R is an alkyl group having about 9 to 19 carbon atoms and a is the integer 1 to 4; $R_2$ and $R_3$ are each alkyl groups having 1 to 3 carbon atoms; $R_4$ is an alkylene or hydroxyalkylene group having from 1 to 4 carbon atoms and, alkylamino carboxylates;

(d) 1% to 12% of a water souluble solvent which is selected from the group consisting of mono- and di- $C_1$–$C_6$ alkyl ethers and esters of ethylene glycol and propylene gylcol;

(e) 0.4% to 10% of a water insoluble organic hydrocarbon, essential oil or a perfume; and (f) the balance being water.

2. The composition according to claim 1, wherein said glycol ether is propylene glycol n-butyl ether.

3. The composition according to claim 1, further including a $C_1$–$C_3$ alcohol.

4. the composition according to claim 1, further including an amine oxide characterized by the formula:

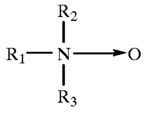

wherein $R_1$ is a $C_{10}$–$C_{18}$ linear or branched chain alkyl group, $R_2$ is a $C_1$–$C_{16}$ linear alkyl group and $R_3$ is a $C_1$–$C_{16}$ linear alkyl group.

* * * * *